United States Patent
Heyden (10) Patent No.: US 7,530,432 B2
(45) Date of Patent: May 12, 2009

(54) BLADDER-ACTUATED RAILROAD RETARDER

(75) Inventor: Thomas J Heyden, Arlington Heights, IL (US)

(73) Assignee: AAA Sales + Engineering, Inc., Oak Creek, WI (US)

(*) Notice: Subject to any disclaimer, the term of this patent is extended or adjusted under 35 U.S.C. 154(b) by 334 days.

(21) Appl. No.: 11/398,247

(22) Filed: Apr. 5, 2006

(65) Prior Publication Data
US 2009/0045019 A1    Feb. 19, 2009

(51) Int. Cl.
B61K 7/02    (2006.01)
(52) U.S. Cl. ..................................................... 188/62
(58) Field of Classification Search ............... 188/62, 188/153 D, 170; 267/64.15, 118, 130; 92/63, 92/93, 130 A
See application file for complete search history.

(56) References Cited

U.S. PATENT DOCUMENTS

| | | | |
|---|---|---|---|
| 1,169,250 A | 1/1916 | Fulton | |
| 1,928,368 A | 9/1933 | Coffey | |
| 2,326,924 A * | 8/1943 | Bone | 188/62 |
| 2,963,043 A | 12/1960 | Davis et al. | |
| 3,042,771 A | 7/1962 | Oliveau | |
| 3,064,685 A * | 11/1962 | Washnock et al. | 92/50 |
| 3,196,985 A | 7/1965 | Rowe et al. | |
| 3,659,680 A | 5/1972 | Soulakis et al. | 188/62 |
| 3,935,795 A | 2/1976 | Hawley | 92/5 |
| 3,946,973 A | 3/1976 | Budway et al. | 246/182 |
| 4,030,574 A | 6/1977 | Evans | 188/62 |
| 4,125,177 A | 11/1978 | Durraffourt | 188/62 |
| 4,198,909 A | 4/1980 | Plantureux | 104/26 |
| 4,292,885 A | 10/1981 | Jinnouchi | 92/43 |
| 4,400,238 A | 8/1983 | Stanislaw et al. | 162/273 |
| 4,513,843 A | 4/1985 | Danieli | 188/62 |
| 4,535,872 A | 8/1985 | Bick et al. | 188/62 |
| 4,650,038 A | 3/1987 | Bick | 188/62 |
| 4,867,279 A | 9/1989 | Link et al. | 188/62 |
| RE33,207 E | 5/1990 | Brodeur | 188/1.11 |
| 4,974,820 A * | 12/1990 | Nakanishi | 267/152 |
| 5,092,248 A | 3/1992 | Parry | 104/26.2 |
| 5,333,707 A | 8/1994 | Kaneda | 188/296 |
| 5,388,525 A | 2/1995 | Bodkin | 104/26.2 |
| 5,575,218 A | 11/1996 | Gutknecht | 104/249 |

(Continued)

OTHER PUBLICATIONS

"Smith's Vacuum-Brake" Continuous Railway Brakes, by Michael Reynolds, 1882.

(Continued)

*Primary Examiner*—Christopher P Schwartz
(74) *Attorney, Agent, or Firm*—Andrus, Sceales, Starke & Sawall, LLP (57) ABSTRACT

An air bladder actuated railroad car retarder is designed to simplify installation, operate in a manner imposing minimal stress on the bladder, improve preventive maintenance, and simplify access to the main fulcrum bearings. The air bladder actuator is made with lightweight aluminum end plates and utilizes a unique stud assembly for attaching the actuator to the retarder pivot arms. Rigid mounting of the air bladder with a unique pivot geometry exposes the bladder to minimal lateral deflection which is balanced in both directions. A simple stroke limiter assembly, external to the air bladder, is also used to measure and monitor wear of the main fulcrum bearings. The stroke limiter assembly is easily demountable and removable to enhance access to the main fulcrum pivot for replacement of the fulcrum bearings.

15 Claims, 7 Drawing Sheets

U.S. PATENT DOCUMENTS

| | | | | |
|---|---|---|---|---|
| 5,676,337 A | | 10/1997 | Giras et al. | 246/182 |
| RE36,084 E | | 2/1999 | Gutknecht | 104/249 |
| 6,006,651 A | * | 12/1999 | Pierce et al. | 92/63 |
| 6,220,400 B1 | | 4/2001 | Kickbush | 188/62 |
| 2004/0159991 A1 | * | 8/2004 | Wolf et al. | 267/140.11 |
| 2006/0131116 A1 | * | 6/2006 | Plantan et al. | 188/153 D |
| 2006/0225968 A1 | * | 10/2006 | Heyden et al. | 188/62 |

OTHER PUBLICATIONS

Firestone Engineering Manual & Design Guide, AIRSTROKE Actuator, 1998.
Goodyear Vehicular Applications Engineering Manual, Super Cushion Air Springs, (date unknown, admitted prior art).
Goodyear Industrial Applications Design Guide, Super Cushion Air Springs, (date unknown, admitted prior art).
International Search Report mailed Aug. 27, 2008.

* cited by examiner

BLADDER-ACTUATED RAILROAD RETARDER

BACKGROUND OF THE INVENTION

The present invention relates to a bladder-actuated low-profile railroad retarder that is particularly suited for a railroad marshalling yard.

Bladder actuators are well known in the railroad industry. In 1882, the Smith Vacuum Brake included a sack or collapsing cylinder. The Firestone AIRSTROKE actuator developed in the 1930s includes upper and lower plates and a flexible bladder secured around the perimeter of each plate to form an airtight interior. The actuator is inflated and deflated to control its height. Down and up stops are used to set the minimum and maximum height or stroke length ($S_L$) of the actuator. A bumper, a chain, a cable or metal stops can be located inside the actuator for this purpose. U.S. Reissue Pat. No. Re 33,207 discloses an on-board braking system using the Firestone actuator. U.S. Pat. No. 6,220,400 discloses a low profile, railway car retarder using the Firestone actuator. The actuator has an internal guide formed by two telescoping tubes, one of which has a stop ring at its end to form the upper and lower limit stops.

The railroad marshalling yard environment is dirty, rugged and non-stop. Retarders, switches, actuators, compressed air controls, related electric and electronic devices, and other components along tracks must withstand exposure to harsh weather, dirt, gravel, petroleum and other chemicals, and withstand being struck by moving objects carried by the cars. Moreover, actuators for retarders produce static vertical forces of about 20,000 pounds to generate the necessary braking power to control the speed of a fully loaded railroad car. Given this demanding environment, the railroad industry places great significance on minimizing maintenance and down time. Bladder actuators must withstand large cyclical loads and a harsh environment while maintaining low maintenance and down time requirements similar to conventional rigid cylinder actuators. The guide mechanism and limit stops of bladder actuators are often located inside the actuator for additional safety reasons.

A problem with railroad retarders is reducing maintenance to meet the demands of a busy marshalling yard setting. Evaluating fulcrum bearing wear is particularly problematic because the bearing is enclosed in the retarder. Conventional retarders must be disassembled to accurately and visually inspect of the bearing. Because closing a portion of the yard is impractical in a busy yard, maintenance personnel resort to using a pry bar to physically pry apart the upper and lower lever arms to determine if there is any wiggle occurring at the fulcrum bearing. Yet, this "wiggle" test is unreliable, particularly when done by a worker who is not familiar with the internal structure and mechanics of the retarder, and is not aware of the likely wear locations of the fulcrum bearing. If the pry bar is not inserted into the retarder and pushed or pulled in directions that will reveal the actual amount of wear, then the test may incorrectly indicate that little or no wear has occurred. Yet, a lack of proper inspection can result in an untimely failure of the fulcrum and retarder, which will then need to be replaced. Replacing a retarder is difficult to schedule because it requires a portion of the yard to be closed, which adversely impacts yard usage. Replacing a retarder during winter months when the ground is frozen is impractical.

Another concern with conventional retarders is the safety of yard maintenance personnel. The longer the workers are close to or in physical contact with the retarder, the more likely they are to be injured due to the daily risks associated with yard work. Inspecting bearing wear places workers at risk because the "wiggle" test requires a worker to stand on or near the retarder to manipulate the pry bar. The test is also inherently dangerous because of the awkward position and significant force a person must exert with the pry bar. Disassembling the retarder to inspect the bearing is even more involved, more time consuming, and more of a safety concern for the workers.

Another problem with conventional air bladder retarders is air consumption. The compressed air supply system for the yard has limited capacity. Conventional air bladder retarders use a significant amount of compressed air each time the retarder is activated. Installing numerous air bladder retarders throughout the yard can significantly increase yard air consumption. If the yard air system is already operating near capacity, installing air bladder retarders may require the addition of an air compressor or the replacement or overhauling of the of the air system. Yet, modifying or replacing the yard compressed air supply system is costly and time consuming, particularly regarding yard down time.

Another problem with air bladder retarders is life expectancy. Any crimping of the bladder during use can cause accelerated wear on the inside surface of the bladder. This wear weakens the bladder and can lead to premature rupturing. This problem is accentuated when the upper and lower plates of the bladder are pivotally connected to the lever arms by pivot pins. The pivot connections allow the plates to rotate, which can lead to undesired crimping. An additional guide mechanism is necessary to maintain the parallel alignment of the upper and lower plates of the bladder actuator. Bladder manufacturers set limits on the relative rotation of the plates when the bladder is in its fully extended or fully collapsed positions. Crimping can occur when the bladder is allowed to arc or accordion out due to relative rotation of the plates.

Another problem with conventional air bladder retarders is predictable use and service requirements. A problem with using an air bladder as an actuator for a railroad retarder is that it is difficult to identify or measure the wear on the bladder such as internal wear caused by crimping. Disassembling the actuator to inspect the bladder involves safety risks, maintenance costs and yard down time. Still, even a small leak in the bladder will waist yard air. Any unpredicted, premature rupture of the bladder will disable the retarder, lead to unplanned and costly replacement and down time, and increase safety risks to yard maintenance personnel.

Another problem with bladder actuators is the design of the guide mechanism. Some bladder actuators use an internal guide rod to form the upper and lower limit stops of the actuator as in U.S. Pat. No. 6,220,400. The guide rod experiences a tension load in excess of 20,000 pounds each time the actuator is opened. This cyclical load loosens the threaded engagement of the guide rod to the upper plate. Yet, maintaining the alignment of the guide rod is critical. Even a slight loosening of the guide rod can result in some lateral movement, which will exponentially increase the loads on and wear rate of the internal bushing or bearing. This loosening of the guide rod, or even the potential loosening of the guide rod, significantly increases the need for routine maintenance and possible down time. Other bladder actuators rely on the fulcrum pin to guide the movement of the actuator plates. Yet, the upper and lower plates for these bladder actuators also join the upper and lower lever arms via pivot pins. This construction can lead to crimping of the bladder, and result in leaks and unpredicted rupture of the bladder.

The present invention is directed to solving these and other problems.

SUMMARY OF THE INVENTION

In accordance with the present invention, a bladder actuated retarder for a rail car includes a stroke limiter linkage assembly, the change in position of which can be monitored to provide an accurate indication of fulcrum bearing wear. The invention is applied to a conventional retarder apparatus including an upper lever arm that is pivotally connected to a lower lever arm with a fulcrum pin assembly. The fulcrum pin assembly includes a pin carried in a cylindrical bearing and rotatable therein. The lever arms have opposed ends to each of which is connected an end of an extensible bladder actuator that is operative to cause relative rotation of the lever arms on the fulcrum pin and to move the opposed ends of the arms apart. In accordance with the present invention, the actuator stroke limiter linkage assembly interconnects the lever arms at a location between the arms and between the fulcrum pin and the actuator to prevent extension of the actuator beyond a desired limit. The stroke limiter assembly is also operative to limit compression of the bladder actuator beyond the limit of collapse recommended by the manufacturer.

In accordance with a preferred embodiment of the invention, the stroke limiter assembly includes a stop link having one end pivotally connected to one of the lever arms and a slotted opposite end receiving a pivot pin for connection to the other lever arm. The slotted end has a stop surface that is engageable by the pivot pin at the desired limit of actuator extension and an opposite stop surface that is engageable by the pivot pin at the desired limit of actuator retraction. The rotational position of the stop link with respect to the other lever arm, when the stop surface is in engagement with the pivot pin, varies with wear of the cylindrical bearing. Means are provided for measuring the rotational position of the stop link to monitor bearing wear. Preferably, the measuring means comprises a reference surface on the other lever arm and a reference face on the stop link. The reference surface and reference face are positioned transverse to the arc of stop link rotation such that a change in the angle between the reference face and the reference surface provides a quantitative indicia of bearing wear.

In a preferred embodiment, the stroke limiter assembly is detachable from its operative position to provide access to the fulcrum pin assembly.

The bladder actuator preferably comprises a rubber air bladder that is operable between a pressurized extended position and a collapsed retracted position. The air bladder includes an expandable rubber bladder member, a pair of aluminum end plates enclosing opposite ends of the bladder with air-tight seals. A series of machine screws are threaded into tapped holes in the end plates, the screws oriented with their screw heads on the interior of the end plates and with flexible sealing rings compressed therebetween. Mounting brackets are rigidly attached to the opposed ends of the lever arms and each mounting bracket has a series of through bores for receipt of the threaded ends of the machine screws. A series of nuts connect the screws to the mounting brackets.

In a further embodiment of the invention, the space within the bladder when the bladder is in the collapsed retracted position is provided with a spacer material that substantially fills the collapsed internal volume. The spacer material is preferably made from a lightweight plastic foam.

The retarder apparatus of the present invention preferably includes a lever arm counterbalance means for causing the opposed ends of the lever arms, connected to opposite ends of the air bladder, to move toward one another when the air bladder is moved to its collapsed position.

In a further embodiment of the invention, the air bladder actuator comprises an expandable rubber bladder member, a pair of rigid end plates that enclose opposite ends of the bladder member with air-tight seals, and mounting brackets that provide rigid connections between the end plates and the opposed ends of the lever arms. The end plates are oriented, in use, to diverge in a direction away from the fulcrum pin in the extended position of the bladder and to move through a neutral position to a position in which the end plates converge in the direction away from the fulcrum pin, whereby lateral deflection of the bladder member is balanced and minimized.

DETAILED DESCRIPTION OF THE INVENTION

Figure 1:
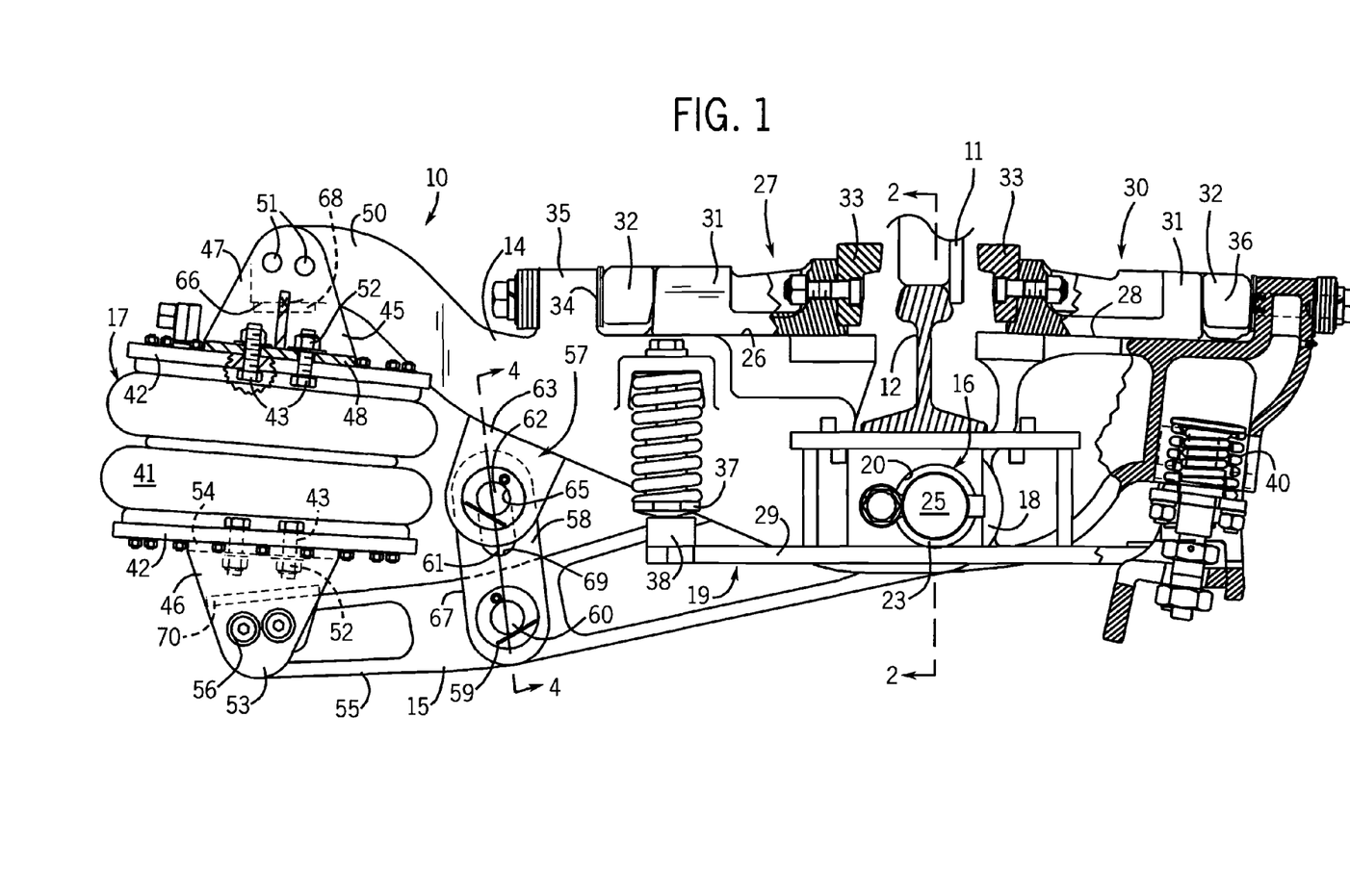
FIG. 1 is a side elevation view, partly in section, showing an air bladder-operated rail car retarder in operative association with a rail and a car wheel.
Figure 7:
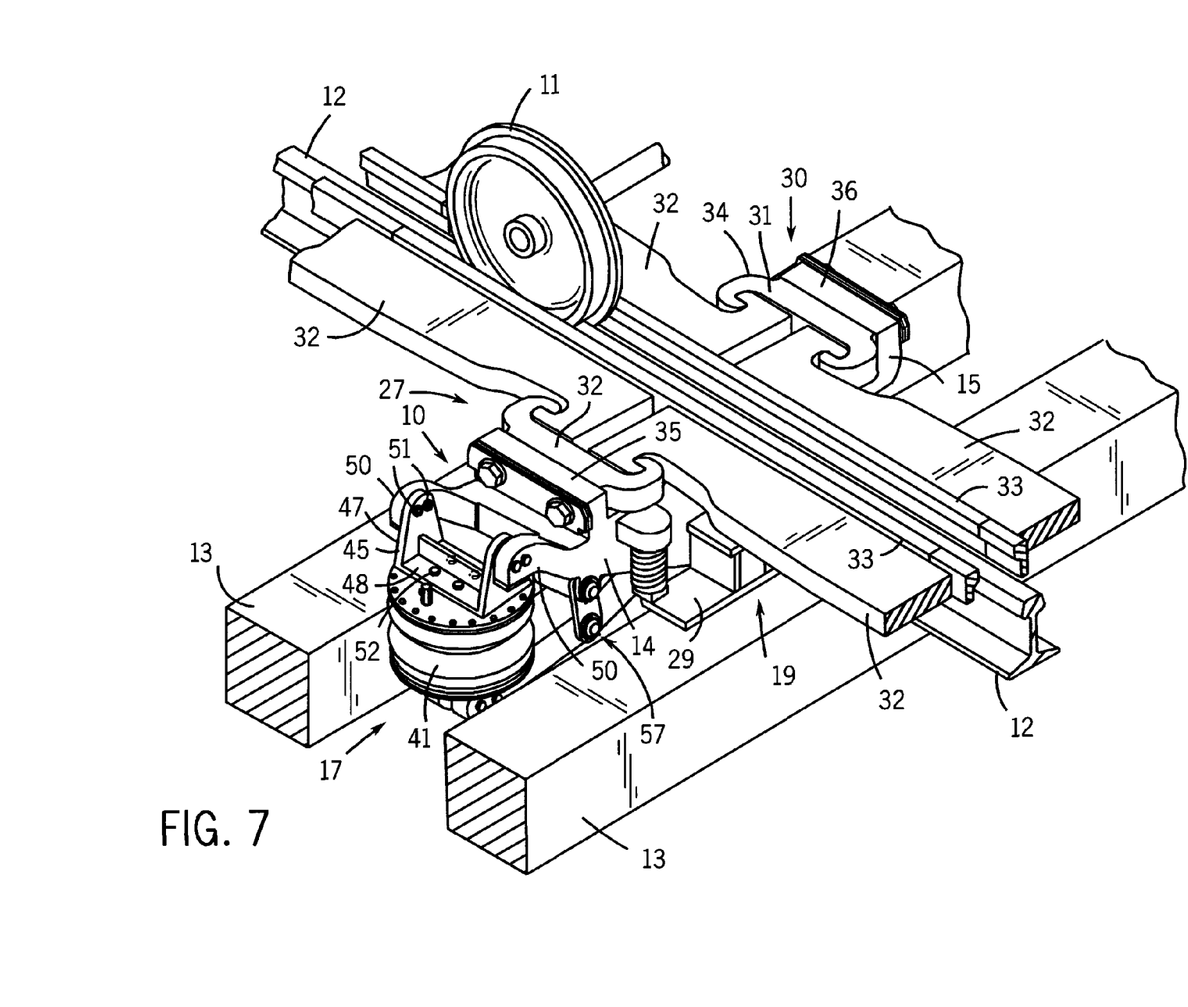
FIG. 7 is an upper perspective view of the air bladder retarder of the present invention in its installed operative position in association with a rail, car wheel and rail ties.

Referring initially to FIGS. 1 and 7, a pneumatic retarder 10 of the present invention is used to control the speed of a moving car in a marshalling yard by engaging opposite faces of a car wheel 11 as it rolls on a rail 12 through the retarder. The retarder 10 is positioned between adjacent ties and extends beneath the rail 12 from an outer field side of the rail to an inner cage side between the rails 12 (only one of which is shown in the drawings). A support structure 19 for the retarder includes substantially identical supports 29 carried by the ties and positioned in opposite sides of the retarder.

Figure 2:
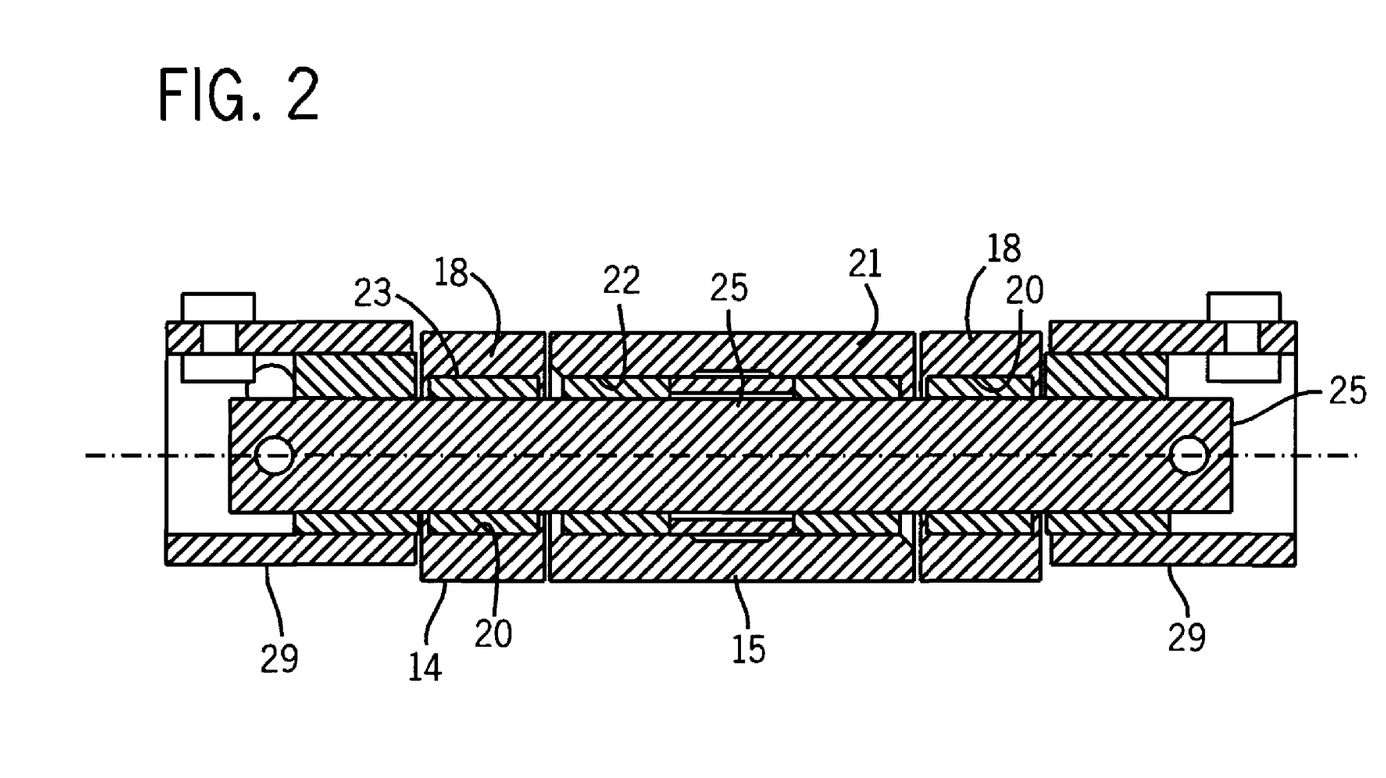
FIG. 2 is a vertical section taken on line 2-2 of FIG. 1.

The retarder 10 has an upper lever arm 14 and a lower lever arm 15 which are pivotally connected with a fulcrum pin assembly 16 positioned directly beneath the rail 12. On the field side of the retarder, the lever arms 14 and 15 have opposed ends to each of which is attached an end of an air bladder actuator 17. The fulcrum end of the upper lever arm 14 has a bifurcated construction defined by a pair of legs 18 provided with aligned through bores 20. The lower lever arm 15, near the end remote from the air bladder actuator 17, is provided with a cylindrical boss 21 having a through bore 22 of the same diameter as the through bores 20 in the legs of the upper lever arm 14. Each of the through bores 20 is provided with a sleeve bearing 23 and, similarly, the through bore 22 is provided with two sleeve bearings 24 identical to the sleeve bearings 23. In assembly, the cylindrical boss 21 of the lower lever arm 15 is received between the legs 18 of the upper lever arm and pivotally connected thereto with a fulcrum pin 25.

As shown in FIG. 1, the upper lever arm 14, adjacent the fulcrum pin assembly 16, is provided with a horizontal mounting surface 26 for a brake beam assembly 27. Similarly, the lower lever arm 15 is provided with a horizontal mounting surface 28 for mounting a brake beam assembly 30. Each of the brake beam assemblies 27 and 30 is essentially the same and includes a brake beam 31 to one end of which is attached an L-shaped brake pad or bar 33. Each brake beam assembly 27 and 30 also includes a thrust block 32 positioned against the opposite end of the brake beam 31. Shims 34 for adjusting and setting the desired braking position of the brake pads 33 are placed between the thrust block and a stop block 35 formed as a part of the upper lever arm 14. The thrust block and shims are secured to the stop block 35 with bolted connections. Similarly, the brake beam assembly 30 for the lower lever arm 15 is attached to the mounting surface 28 with bolted connections through stop block 36.

Figure 3A:
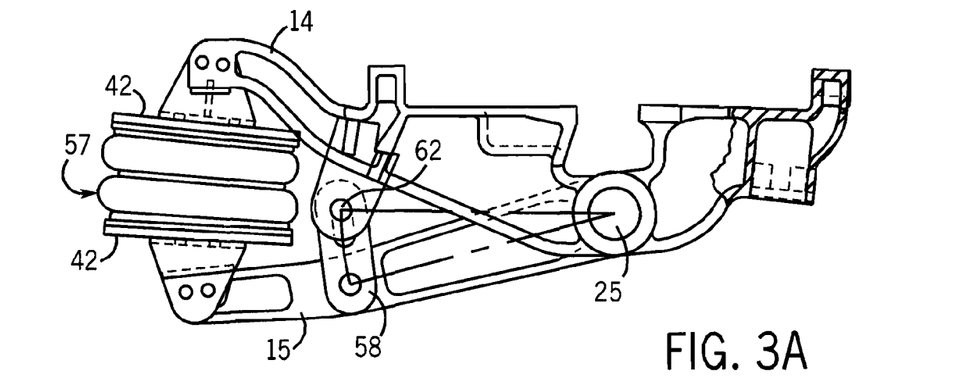
FIG. 3A is a side elevation view similar to FIG. 1 showing the air bladder in its fully extended position.
Figure 3B:
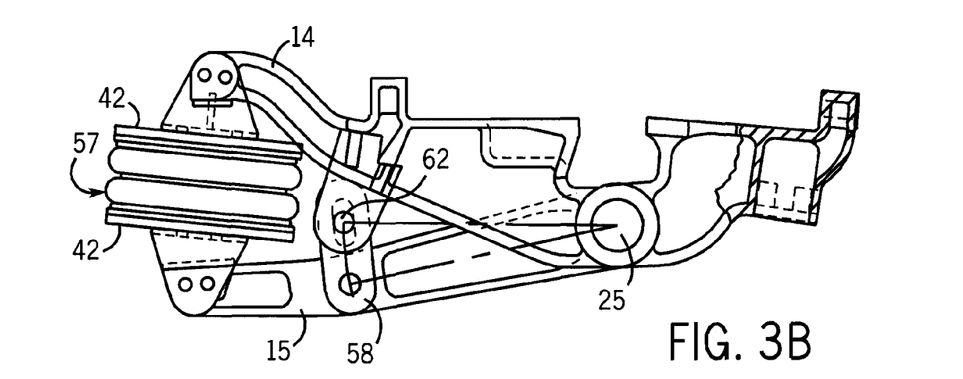
FIG. 3B is a side elevation view similar to FIG. 3a showing the air bladder in a mid-stroke position.
Figure 3C:
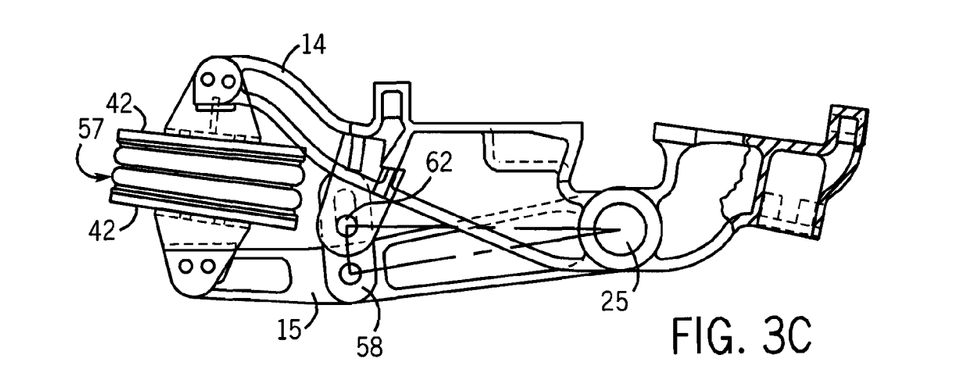
FIG. 3C is a side elevation similar to FIGS. 3A and 3B showing the air bladder in a retracted fully collapsed position.

When the air bladder actuator 17 is pressurized, it expands and extends to force the attached ends of the upper and lower lever arms 14 and 15 apart which motion is translated through the fulcrum pin assembly 16 to cause the brake pads 33 to move toward one another and engage opposite faces of the car wheel 11 with a desired braking force, as shown in FIG. 3A. When it is desired to remove the braking force, the pressure in the air bladder is released and the ends of the lever arms 14 and 15 move relatively toward one another, through the mid-stroke position shown in FIG. 3B to the final retracted and collapsed position shown in FIG. 3C. In moving to the FIG. 3C position, the upper lever arm 14 moves under the force of gravity downwardly until a pair of cushioned stops 37 engage a fixed frame member 38 on the support 29. This movement, of course, also causes the upper lever arm brake pads 33 to move away from the rail and car wheel 11. Similarly, the force of gravity would also tend to move the lower lever arm 15 downwardly. However, because the lower lever arm brake pad 33 must also be moved away from the rail and car wheel 11, a compression spring 40 on the end of the lower lever arm 15, and in operative engagement with the support 29, forces the actuator end of the lower lever arm upwardly and the brake pad 33 to move away from its braking position. The compression spring arrangement 40 is carefully designed and adjusted to move the lower lever arm upwardly, as indicated, but not to also lift the upper lever arm 14 off the stops 37.

Figure 6:
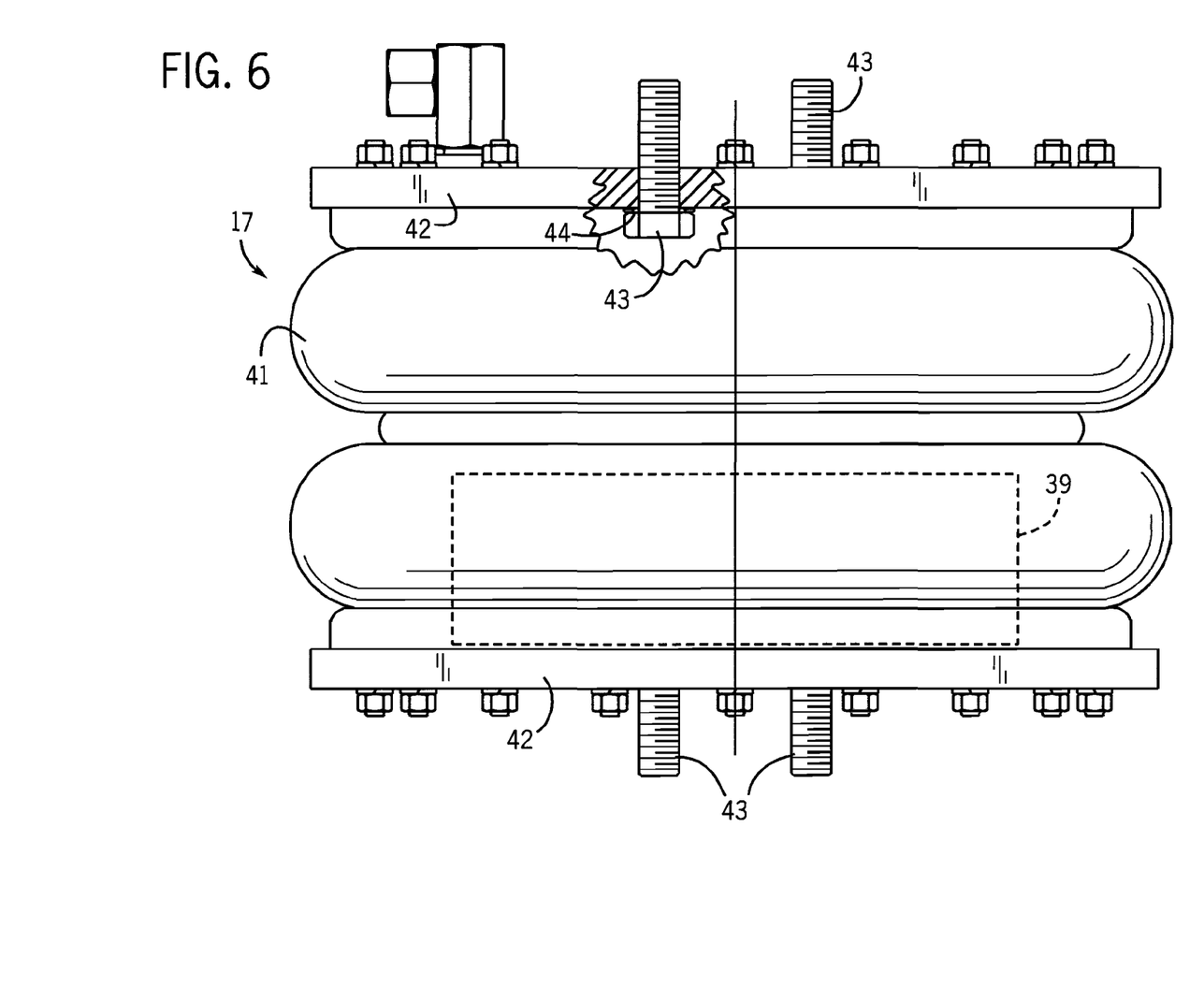
FIG. 6 is a side elevation, partly in section, of the preferred construction of the air bladder used in the retarder of the subject invention.

Referring also to FIG. 6, the air bladder actuator 17 includes a conventional rubber air bladder 41 of a type identified above. However, instead of utilizing conventional steel end plates, the preferred embodiment of the air bladder actuator 17 of the present invention utilizes aluminum end plates 42. The substitution of aluminum end plates reduces considerably the weight of the actuator 17 such that it is within the limit safely lifted by one person. Its weight of less than 50 lbs. (about 23 kg) is within the lifting limits adhered to in the rail industry. However, care must be taken to avoid stripping threaded connections in aluminum which are much softer and more easily damaged than are steel. To connect the end plates 42 to the respective upper and lower lever arms 14 and 15, each end plate 42 is tapped for four machine screws 43. A sealing ring 44 is placed on the screw shank and the bolt is threaded from the inside through the tapped hole in the end plate to compress the sealing ring 44 between the screw head and the inside face of the plate 42. Preferably, suitable thread locking compound is applied to the screw threads as well. Sealing ring 44 is preferably a Stat-O-Seal ring made by Parker Hannifin Corporation. The net effect of mounting the machine screws 43 as indicated is to enable them to act like threaded studs and without concern for the damaging the tapped holes in the aluminum end plates 42. Furthermore, an extremely effective air seal is created for the air bladder 41.

Attachment of the upper and lower aluminum end plates 42 to the respective upper and lower lever arms 14 and 15 is accomplished by the use of upper and lower mounting brackets 45 and 46, respectively. Referring also to FIG. 7, the upper mounting bracket 45 is generally U-shaped and includes a pair of legs 47 connected by a web 48. Each of the legs 47 is connected to an end arm 50 of the upper lever arm with two plug welds 51. The web 48 is connected directly to the machine screws 43 secured in the end plate 42 with suitable nuts 52 and washers. The lower mounting bracket 46 is also U-shaped and has a pair of legs 53 interconnected by a web 54. The legs are attached to an end arm 55 of the lower lever arm 15 with connecting bolts 56. Each of the connections between the upper lever arm end arms 50 and the legs 47 of the mounting bracket are made with two plug welds 51. Two connecting bolts 56 are used to connect each lower mounting bracket leg 53 to the lower lever end arm 55. The connection of the air bladder actuator 17 to the upper and lower lever arms 14 and 15 is thus rigid and immovable.

As mentioned in the Background above, manufacturers of air bladders of the type used in the present invention caution against excessive lateral deflection of the bladder in use which may result in crimping and premature failure. One prior art solution to this problem is to utilize a guide rod or other linear guiding mechanism on the interior of the bladder. The bladder actuator end plates are then pivotally connected to the upper and lower lever arms, rather than with the rigid connections used in the apparatus of the present invention. Internal guide mechanisms are heavy and expensive, but are, nevertheless, subject to high loads and the risk of failure.

The connections of the air bladder end plates 42 to the upper and lower lever arms 14 and 15 in the construction of the present invention holds the rubber air bladder 41 securely against excessive lateral deflection and, moreover, minimizes lateral deflection in either direction as compared to prior art devices. Referring again to FIGS. 3A-3C, lateral deflection of the air bladder 41 (in the direction of the length of the lever arms 14 and 15) is minimized and balanced as the bladder flexes from the fully extended FIG. 3A position to the fully collapsed FIG. 3C position. More particularly, the actuator end plates 42 are positioned to diverge in the direction away from the fulcrum pin 25 in the extended FIG. 3A position. As the bladder collapses to the neutral mid-stroke position of FIG. 3B, the end plates 42 assume a parallel orientation. As the bladder compresses further to its fully collapsed FIG. 3C position, the mounting plates assume a convergent position in the direction away from the fulcrum pin. In this manner, the air bladder flexes laterally in both directions, each of which is a minimal deflection, well within the limits recommended by the manufacturer, and far short of resulting in potentially damaging crimping.

Figure 4:
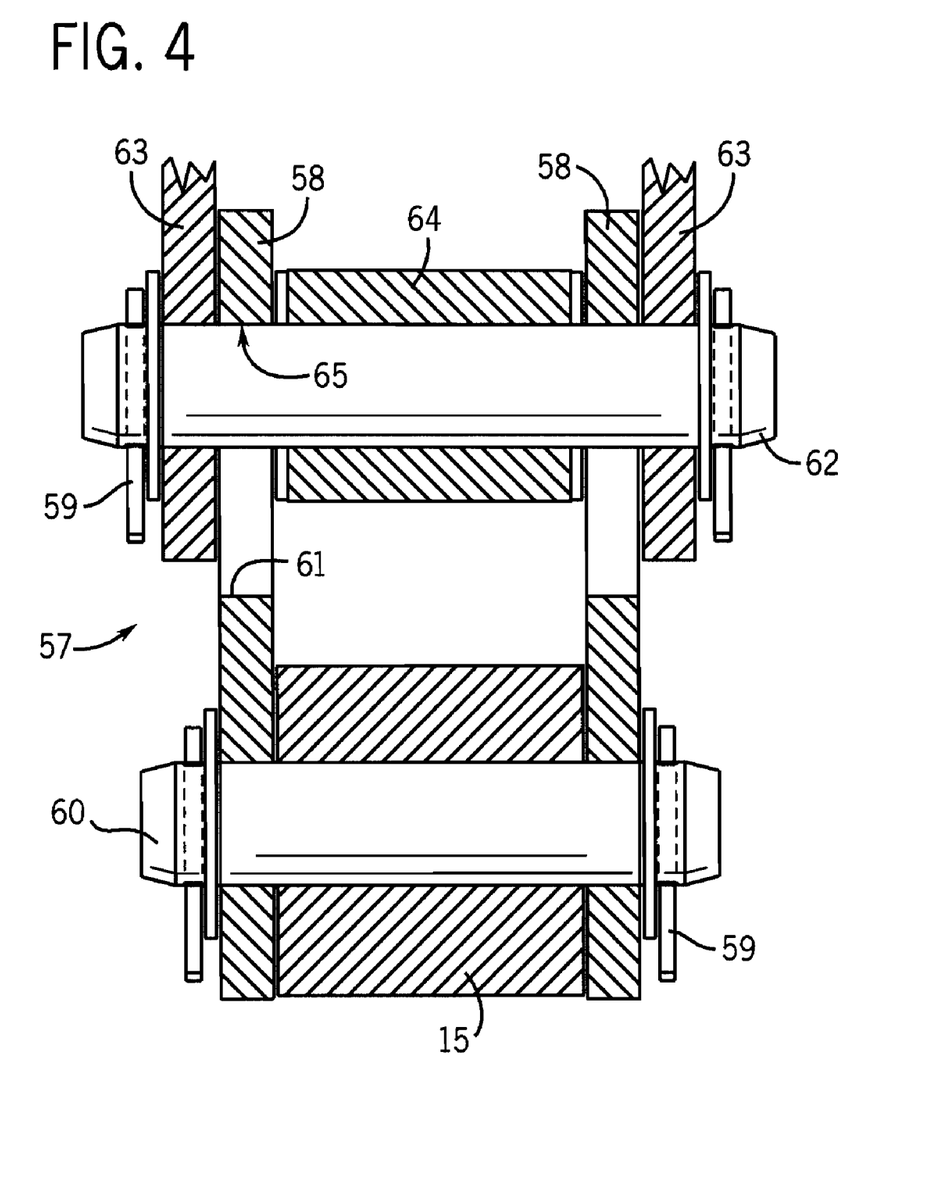
FIG. 4 is a vertical section taken on line 4-4 of FIG. 1.
Figure 5:
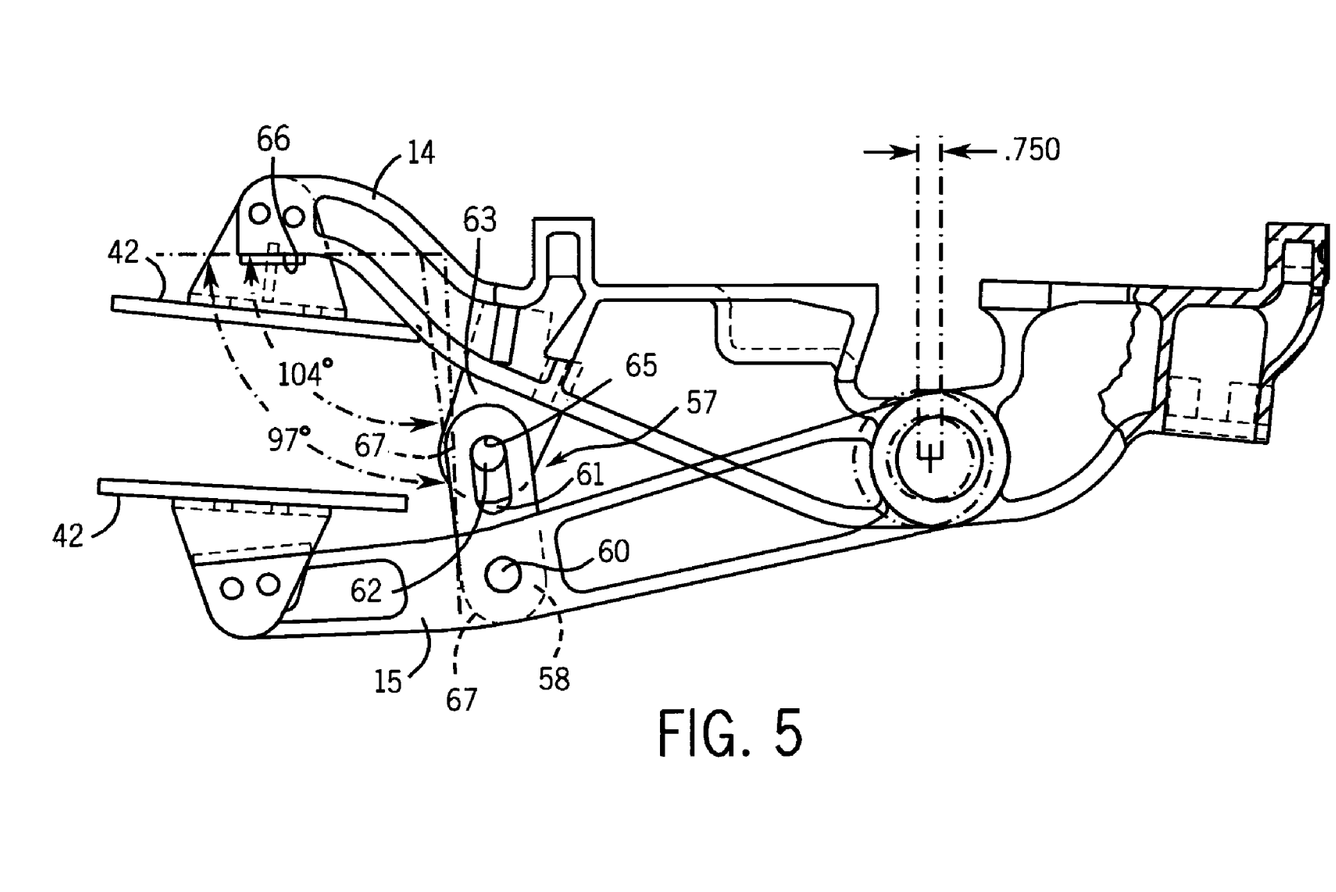
FIG. 5 is a side elevation of the retarder shown in FIG. 1, with parts removed for clarity, showing the means for monitoring fulcrum bearing wear in accordance with the present invention.

Referring also to FIGS. 4 and 5, the retarder 10 must be provided with an actuator stroke limiter to prevent the air bladder 41 from being extended beyond the limits set by the manufacturer and by the requirements of the maximum braking force desired to be applied to the car wheels 11. Because the use of guide and stop means that are internal to the air bladder actuator are fraught with high cost, complexity and unreliability, the retarder of the present invention utilizes a simple stroke limiter linkage assembly 57 that operates effectively and reliably, can be easily removed if necessary to access the fulcrum pin assembly 16, and can also be used to monitor wear of the fulcrum bearings as will be described in detail below. The stroke limiter assembly 57 includes a pair of parallel stop links 58 that are pivotally attached to the lower lever arm 14 with a lower pivot pin 60. The upper opposite ends of the stop links 58 are provided with slots 61 dimensioned to receive an upper pivot pin 62 extending through the slots 61 and pivotally mounted in a pair of mounting ears 63 extending downwardly from the underside of the upper lever arm 14. The stop links 58 are maintained in a parallel spaced orientation by a spacer bushing 64. When the air bladder actuator 17 is pressurized and caused to expand, the upper pivot pin 62 moves upwardly in the slots 61 until it engages stop surfaces 65 defined by the upper edges of the slots 61, as shown in FIGS. 1 and 5. To limit the maximum retracted or collapsed position of the air bladder, the opposite ends of the slots 61 in the stop links 58 provide down stop surfaces 69 which are engaged by the upper pivot pin 62 to halt compression of the bladder at a limit prescribed by the manufacturer. The outer ends of each of the pins 60 and 62 may be secured against axial displacement with simple cotter pin connections 59. When it is desired to disassemble or remove the stroke limiter assembly, as for access to the fulcrum pin or to repair or replace the stroke limiter assembly itself, the removal of two cotter pins 59 is all that is required.

Referring particularly to FIG. 5, the rugged operating conditions and high operating loads to which the retarder 10 is exposed in service result in wear of the fulcrum sleeve bearings 23 and 24. Such wear inherently leads to looseness in the fulcrum pin assembly, the extent of which has been difficult to determine in prior art retarders, as mentioned in the Background description above. The cylindrical sleeve bearings 23 and 24 typically have a wall thickness of 0.375 inch (about 10 mm). As the upper lever arm bearings 23 wear, the upper lever arm will move laterally away from the fulcrum pivot (to the left in FIG. 5) by a maximum amount of 0.375 inch. Similarly, wear of the lower lever arm bearings 24 will result in movement of the lower lever arm as much as 0.375 inch in the opposite direction.

This could result in a total displacement of the lever arms with respect to one another of 0.750 inch (about 20 mm). This displacement of the lever arms is reflected directly in increased pivotal movement within the stroke limiter assembly 57. Specifically, as bearing wear increases, the position of the stop links 58 with respect to the mounting ears 63 and upper lever arm 14 changes in a generally linear relation. When the bearings are new and there is no "wiggle" in the fulcrum pin assembly 16, the angle between a machined reference surface 66 on the underside of the upper lever arm 14 and a reference face 67 on one of the stop links 58 can be measured when the bladder is fully extended, as with a digital protractor. In the example shown in FIG. 5, the angle in a new bearing, no-wiggle situation is 97°. At full wear displacement of 0.750 inch, the angle increases to 104°. This provides the ability to monitor bearing wear in a simple, safe and cost-effective manner and to take the retarder out of service for bearing replacement in a scheduled manner that avoids unexpected failure. When bearing replacement becomes necessary, the stroke limiter assembly 57 can be easily taken apart to permit access to the fulcrum pin assembly 16, including the bearings 23 and 24.

The subject invention also addresses the problem associated with the high volume of compressed air required to operate a air bladder actuator. First of all, in its inactive retracted and collapsed position, the air bladder still defines a considerable open internal volume. Upon actuation to extend the bladder, the collapsed internal volume must first be pressurized and then additional compressed air must be utilized to extend the bladder. In one embodiment of the present invention, an internal spacer 39 as shown in FIG. 6, is placed inside the bladder actuator 17 before the second aluminum end plate 42 is attached. The spacer preferably is a solid piece of lightweight material of cylindrical shape that will substantially fill, but have a volume somewhat less than the collapsed internal volume of the actuator. The spacer is preferably made from a lightweight plastic foam, such as closed-cell polyurethane.

Referring again to FIG. 1, a load bearing land 68 is welded to the outside of each of the legs 47 and extends under one of the end arms 50 of the upper lever arm 14. Land 68 provides two functions. First of all, in assembly, the surface of the land is brought into contact with the reference surface 66 to accurately locate the bracket with respect to the end arm 50 for making the plug welds 51. In addition, land 68 provides a direct load bearing path between the upper lever arm and the bladder mounting bracket 45 so that the plug welds 51 do not have to transmit operating load. In the remote event of plug weld failure, the load bearing land 68 would also continue to function to bear full operating load.

A similar arrangement is provided for the lower lever arm 15 and the lower mounting bracket 46. A lower load bearing land 70 is welded or otherwise secured between the opposite inside faces of the legs 53 of the lower mounting bracket 46. The land 70 is positioned to accurately locate the bracket with respect to the end arm 55 of the lower lever arm 15 to facilitate making the connection via connecting bolts 56. In addition, as with the upper load bearing land 68, the lower land 70 provides a direct load bearing path between the lower mounting bracket 46 and the lever arm 15 such that the connecting bolts 56 do not have to carry the operating load. In some prior art devices, similar connecting bolts that are responsible for full transmission of the operating load have been known to loosen in service, resulting in poor performance and potential failure.

I claim:

1. A bladder retarder for braking engagement of a rail car wheel comprising:
   an upper lever arm pivotally connected to a lower lever arm with a fulcrum pin assembly;
   said fulcrum pin assembly including a pin carried in a cylindrical bearing and rotatable therein;
   the lever arms having opposed ends to each of which is connected an end of an extensible air bladder actuator operative to cause relative rotation of the lever arms on the pin and to move the opposed ends of the arms apart;
   an actuator stroke linkage limiter assembly interconnecting the lever arms, between said arms and between the fulcrum pin and the actuator, to prevent extension and retraction of the actuator beyond desired limits.

2. The apparatus as set forth in clam 1 wherein said stroke limiter assembly includes a stop link having one end pivotally connected to one lever arm and a slotted opposite end receiving a pivot pin for connection to the other lever arm, said slotted end having a stop surface engageable by the pivot pin at the desired limit of actuator extension.

3. The apparatus as set forth in claim 2 wherein the slotted end has an opposite stop surface engageable by the pivot pin at a desired limit of actuator retraction.

4. The apparatus as set forth in claim 2 comprising:
   a pair of parallel stop links;
   a lower pivot pin providing a pivotal connection to the lower lever arms;
   a pair of mounting ears extending downwardly from the upper lever arm;
   an upper pivot pin extending through the slots in the stop links and providing a pivotal connection to the mounting ears; and,
   retaining pins through the outer ends of the upper and lower pivot pin ends, whereby the stroke limiter assembly may be disassembled by removing two retaining pins.

5. The apparatus as set forth in claim 2 wherein the rotational position of the stop link with respect to the other lever arms, when the stop surface is in engagement with the pivot pin, varies with wear of the cylindrical bearing; and,
   means for measuring said rotational position to monitor bearing wear.

6. The apparatus as set forth in claim 5 wherein said measuring means comprises:
   a reference surface on said other lever arm;
   a reference face on the stop link;
   said reference surface and said reference face positioned transverse to the arc of stop link rotation, whereby a change in the angle between said face and said surface provides a quantitative indicia of bearing wear.

7. The apparatus as set forth in clam 6 wherein the air bladder comprises:
   an expandable rubber bladder member;
   a pair of aluminum end plates enclosing opposite ends of the bladder member with air-tight seals;
   a series of machine screws threaded into tapped holes in the end plates, said machine screws oriented with the screw heads on the interior of the end plates with flexible sealing rings compressed therebetween;
   mounting brackets rigidly attached to the opposed ends of the lever arms, each mounting bracket having a series of through bores for receipt of the threaded ends of the machine screws; and,
   a series of nuts connecting the screws to the mounting brackets.

8. The apparatus as set forth in claim 1 wherein the actuator comprises a rubber air bladder operable between a pressurized extended position and a collapsed retracted position.

9. The apparatus as set forth in claim 8 wherein the air bladder when not pressurized has a collapsed internal volume of a given amount, and further including a spacer within the bladder having a volume less than said collapsed internal volume.

10. The apparatus as set forth in claim 9 wherein the spacer is made from a lightweight plastic foam.

11. The apparatus as set forth in claim 8 wherein the air bladder comprises:
    an expandable rubber bladder member;
    a pair of aluminum end plates enclosing opposite ends of the bladder member with air-tight seals;
    whereby the air bladder assembly is sized to weigh less than 50 pounds and is within lifting limits for one person adhered to in the rail industry.

12. The apparatus as set forth in claim 8 including counterbalance means for causing the opposed ends of lever arms to move toward one another when the air bladder is moved to its collapsed position.

13. The apparatus as set forth in claim 8 wherein the air bladder actuator comprises an expandable rubber bladder member, a pair of rigid end plates enclosing opposite ends of the bladder member with air-tight seals, and mounting brackets providing rigid connections between the end plates and the opposed ends of the lever arms, said end plates oriented, in use, to diverge in a direction away from the fulcrum pin in the extended position of the bladder and to move through a neutral position to converge in the direction away from the fulcrum pin when the bladder is collapsed, whereby lateral deflection of the bladder member is balanced and minimized.

14. The apparatus as set forth in claim 8 wherein the air bladder actuator comprises an expandable rubber bladder member, a pair of rigid end plates enclosing opposite ends of the bladder member with air-tight seals, and mounting brackets providing rigid connections between the end plates and the opposed ends of the lever arms, wherein the connections between the brackets and the ends of the lever arms are selected from the group consisting of welds and bolts, said apparatus further comprising a load-bearing land secured to each mounting bracket and positioned to bear against its respective lever arm to provide, in use, a load bearing path.

15. The apparatus as set forth in claim 1 wherein the stroke limiter assembly is detachable from its operative position to provide access to the fulcrum pin assembly.

* * * * *